(12) United States Patent
Shirai et al.

(10) Patent No.: US 9,598,846 B2
(45) Date of Patent: Mar. 21, 2017

(54) AUTOMATIC WATER FAUCET

(71) Applicant: LIXIL Corporation, Tokyo (JP)

(72) Inventors: Yuki Shirai, Tokyo (JP); Azumi Kamata, Tokyo (JP)

(73) Assignee: LIXIL CORPORATION, Tokyo (JP)

( * ) Notice: Subject to any disclaimer, the term of this patent is extended or adjusted under 35 U.S.C. 154(b) by 0 days.

(21) Appl. No.: 15/080,204

(22) Filed: Mar. 24, 2016

(65) Prior Publication Data

US 2016/0201306 A1 Jul. 14, 2016

Related U.S. Application Data

(63) Continuation of application No. PCT/JP2014/002841, filed on May 29, 2014.

(30) Foreign Application Priority Data

Sep. 30, 2013 (JP) ................. 2013-205103

(51) Int. Cl.
| | |
|---|---|
| *E03C 1/00* | (2006.01) |
| *E03C 1/05* | (2006.01) |
| *G01S 17/88* | (2006.01) |
| *G01S 17/02* | (2006.01) |
| *G01S 17/08* | (2006.01) |

(52) U.S. Cl.
CPC ............. *E03C 1/057* (2013.01); *E03C 1/055* (2013.01); *G01S 17/026* (2013.01); *G01S 17/08* (2013.01); *G01S 17/88* (2013.01)

(58) Field of Classification Search
CPC .................................................. G05D 23/1393
USPC ..................................................... 4/668–669
See application file for complete search history.

(56) References Cited

U.S. PATENT DOCUMENTS

2013/0074938 A1 3/2013 Chen et al.

FOREIGN PATENT DOCUMENTS

| CN | 1118178 A | 3/1996 |
|---|---|---|
| CN | 102261504 A | 11/2011 |
| CN | 202767187 U | 3/2013 |
| JP | 2003-147823 A | 5/2003 |
| JP | 2005-207012 A | 8/2005 |

(Continued)

OTHER PUBLICATIONS

International Search Report from International Application No. PCT/JP2014/002841 mailed on Aug. 19, 2014.

(Continued)

*Primary Examiner* — Lori Baker
(74) *Attorney, Agent, or Firm* — Claire Zopf

(57) ABSTRACT

An automatic water faucet includes: a water faucet; an imaging unit provided in a water discharge port of the water faucet and that images light reflected from a measure-distance target; a distance measurement unit that measures a distance from the imaging unit to the measure-distance target based on image data; a threshold setting unit that sets a threshold for distance; a detection unit that detects the measure-distance target as a detection object if the distance is shorter than the threshold set by the threshold setting unit; and a water supply control unit that causes the water faucet to discharge water in response to the detection unit detecting a detection object and causes the water faucet to stop supplying water in response to the detection unit not detecting a detection object. The threshold setting unit increases the threshold setting in response to the detection unit detecting a detection object.

5 Claims, 9 Drawing Sheets

(56) References Cited

FOREIGN PATENT DOCUMENTS

JP          2011-137289  A      7/2011

OTHER PUBLICATIONS

Search Report from Chinese Patent Application No. 201480051918.7 mailed on Sep. 7, 2016.

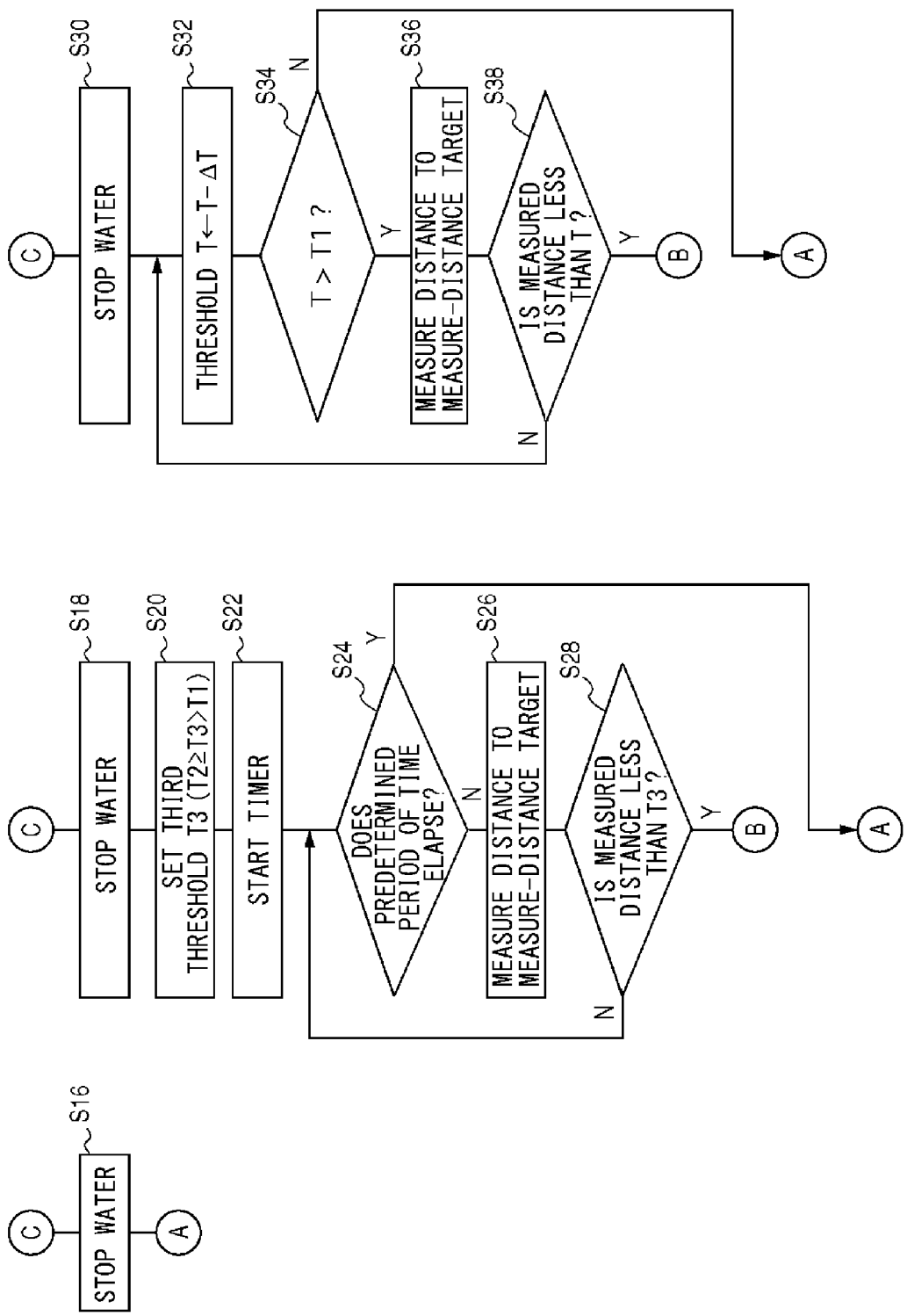

AUTOMATIC WATER FAUCET

BACKGROUND OF THE INVENTION

1. Field of the Invention

The present invention relates to automatic water faucets.

2. Description of the Related Art

Automatic water faucets that use a person-detecting sensor to detect light reflected from a detection object such as a user's hand, or dishes placed in a sink, and discharge water automatically have been known to date. Among such automatic water faucets, some are configured to vary the threshold quantity for the sensor to receive light, for cases where, in addition to light reflected from a detection object, light reflected from discharging water is received.

With person-detecting sensors that when a received-light quantity exceeding a preset threshold is detected sense the detection object, setting the threshold for the received-light quantity relatively high lowers the sensitivity to the detection object. This sets up a state where the detection object is not so readily detected, such that the water faucet shuts off the water more easily. Because influence from noise etc. may be reduced, the water will not shut off due to something being detected that essentially should not be detected, controlling to a minimum situations where water is left running from the water faucet (reference is made to, for example Patent Document 1).

[Patent Document 1] Japanese Patent Application Publication No. 2011-137289

With the technology described above, however, it is imaginable that water shutoff unintended by a user in the midst of, for example, washing dishes is liable to occur. Setting the light-quantity threshold for the person-detecting sensor lower in order to control unintended water shutoff like this could instead give rise to the water not shutting off even when the dishwashing has been finished. On that account, technology whereby usability experienced by a user is improved in water-supply control employing a person-detecting sensor is being called for.

SUMMARY OF THE INVENTION

An object of the present invention, brought about taking into consideration the problems to date, is to make available technology that improves usability experienced by a user in water-supply control employing a person-detecting sensor.

In order to address the above issue, an automatic water faucet according to an embodiment of the present invention includes: a water faucet; an imaging unit provided in a water discharge port of the water faucet and that images light reflected from a measure-distance target; a distance measurement unit that measures distance from the imaging unit to the measure-distance target based on image data captured by the imaging unit; a threshold setting unit that sets a threshold for distance; a detection unit that detects the measure-distance target as a detection object if the distance that the distance measurement unit measures is shorter than the threshold set by the threshold setting unit; and a water supply control unit that causes the water faucet to discharge water in response to the detection unit detecting a detection object, and causes the water faucet to stop supplying water in response to the detection unit not detecting a detection object. The threshold setting unit increases the threshold setting in response to the detection unit detecting a detection object.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIGS. 9A-9C show the second half of the flowchart, illustrating the flow of threshold control performed by the control unit according to the embodiment.

DETAILED DESCRIPTION OF THE INVENTION

Figure 1:
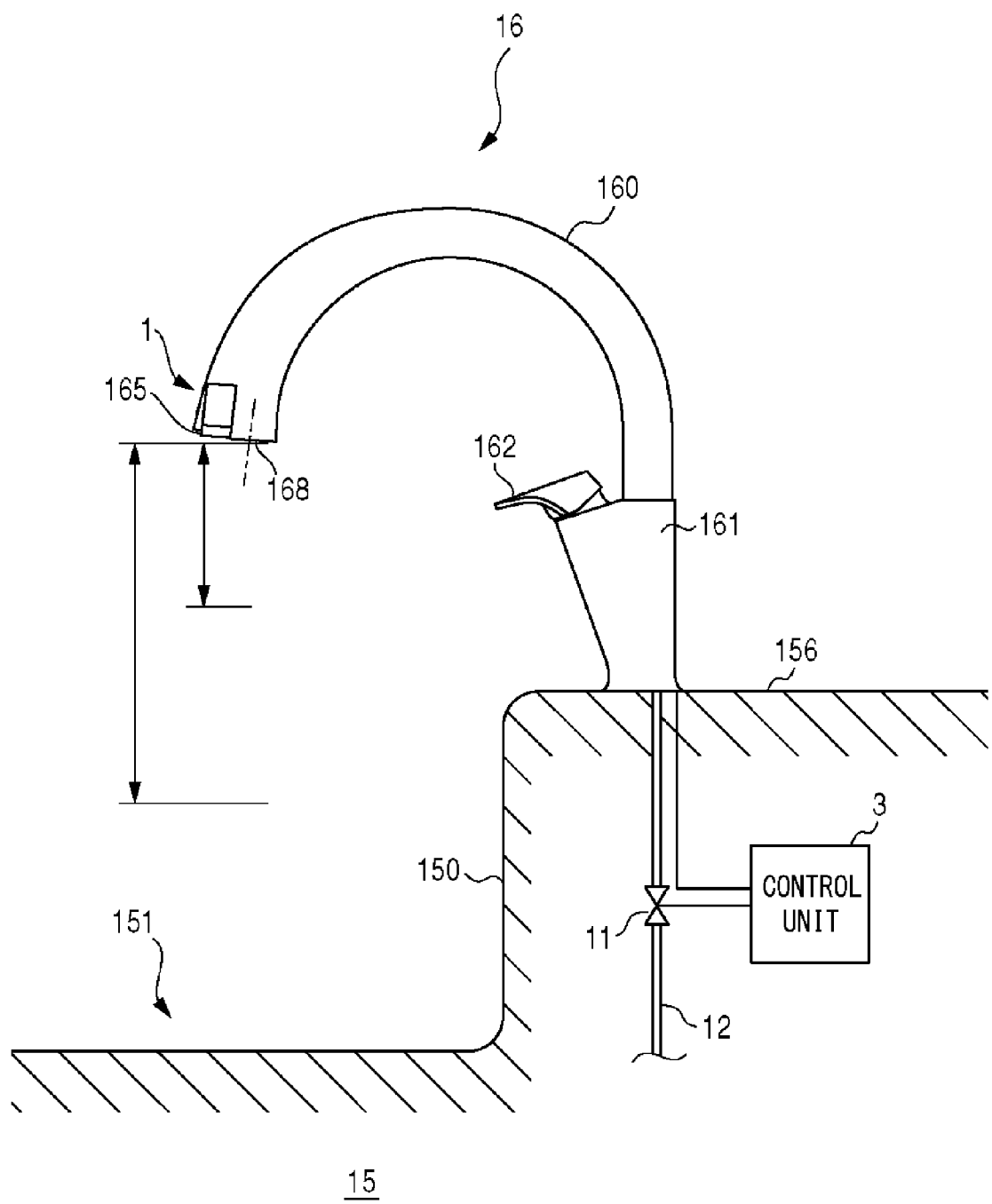
FIG. 1 is a cross-sectional view of a sink provided with a water faucet according to an embodiment.

FIG. 1 is a cross-sectional view of a sink 15 provided with an automatic water faucet 16 according to an embodiment of the present invention. As shown in FIG. 1 the sink 15 is provided with a bowl 151 provided in a counter and recessed in a concave shape, and the automatic water faucet 16 having a water discharge port 168. The automatic water faucet 16 is provided on a counter top 156 that forms the upper surface of the counter 155. A drainage port (not shown) is disposed at the deepest part of the bowl 151. The following description assumes that the sink 15 is a kitchen sink mainly used to wash dishes.

The automatic water faucet 16 is provided with a base 161 that forms a seat on the counter top 156, and an approximately arc-shaped pipe conduit 160 having one end thereof connected to the base 161 and the other end facing toward the bowl 151. The water discharge port 168 opens at the other end of the pipe conduit 160. A filter plate 165 forming a detection surface of a detection sensor 1 is provided at the other end of the pipe conduit 160. The filter plate 165 is a resin filter configured to transmit light in an infrared region selectively. The detection sensor 1 is provided in the pipe conduit 160.

The automatic water faucet 16 automatically controls discharging and stopping of water by referring to a result of detection of a person by the detection sensor 1. A handle 162 for opening the faucet is provided in the base 161. The user can manually control the flow rate and temperature of discharged water. A control unit 3 is built in the sink 15. Water is supplied to the pipe conduit 160 via a water supply pipe 12 and a solenoid 11, which is a water faucet (electromagnetic valve) provided in the water supply pipe 12.

Figure 2:
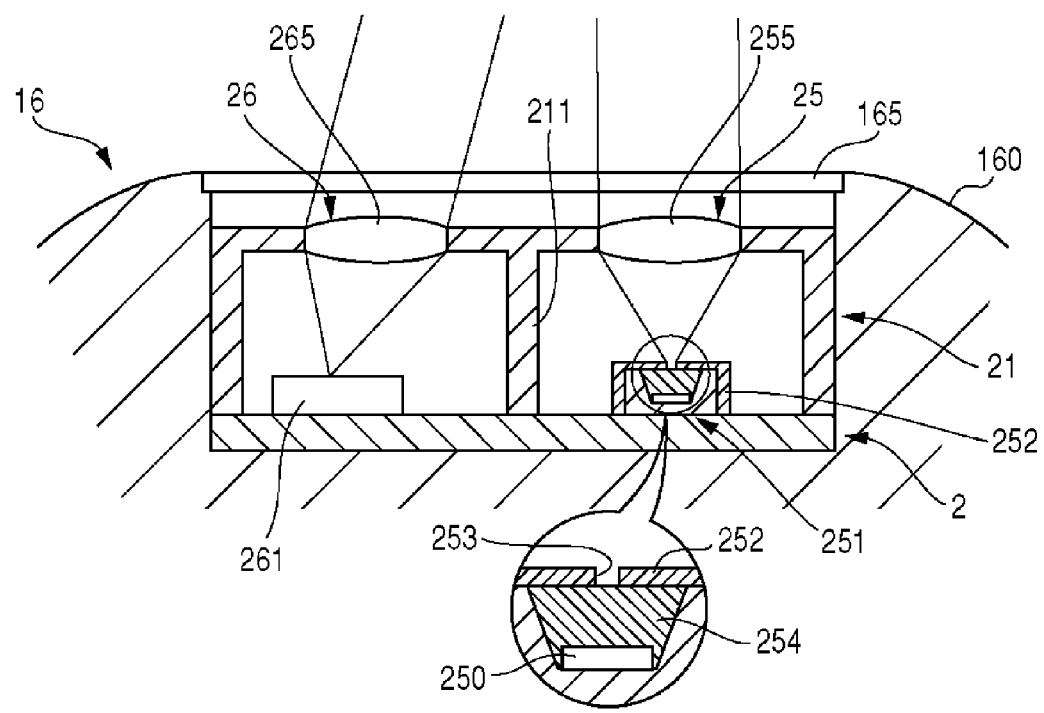
FIG. 2 is a cross-sectional view of a detection sensor according to the embodiment.

FIG. 2 is a cross-sectional view of the detection sensor 1 according to the embodiment. As shown in FIG. 2, the detection sensor 1 includes a sensor unit 2 and the filter plate 165. The operation of the detection sensor 1 is controlled by the control unit 3 built in the sink 15. The automatic water faucet is formed by a combination of the detection sensor 1, the control unit 3, and the solenoid 11.

As shown in FIG. 2, the sensor unit 2 is a unit where a light emitting diode (LED) element 251 and a line sensor 261 are housed in a housing 21. The sensor unit 2 operates when receiving power supply from the control unit 3. A light-emitting unit 25 and an imaging unit 26 are arranged in the sensor unit 2. The light-emitting unit 25 emits infrared light via the filter plate 165 and the imaging unit 26 images the reflected light. The light-emitting unit 25 that emits infrared light is provided with the LED element 251 and a light projection lens 255. The imaging unit 26 is provided with the line sensor 261 and a condenser lens 265. The light-emitting unit 25 and the imaging unit 26 are arranged offset by a predetermined offset amount in a horizontal direction across a partition 211 having a light shielding property. The line sensor 261 is implemented by a known solid-state image sensing device such as a charge coupled device (CCD) or a complementary metal oxide semiconductor (CMOS) image sensor.

The LED element 251 is a light-emitting element in which an LED chip 250 mounted in a cavity of a package substrate is sealed by a transparent resin 254 and emits an infrared light. In the light-emitting unit 25, the LED element 251 is covered by an element case 252 having a light shielding property on which a slit hole 253 is provided along a longitudinal direction. This light-emitting unit 25 allows light, whose spread angle in a horizontal direction is reduced, to be incident toward a measure-distance target.

Figure 3:
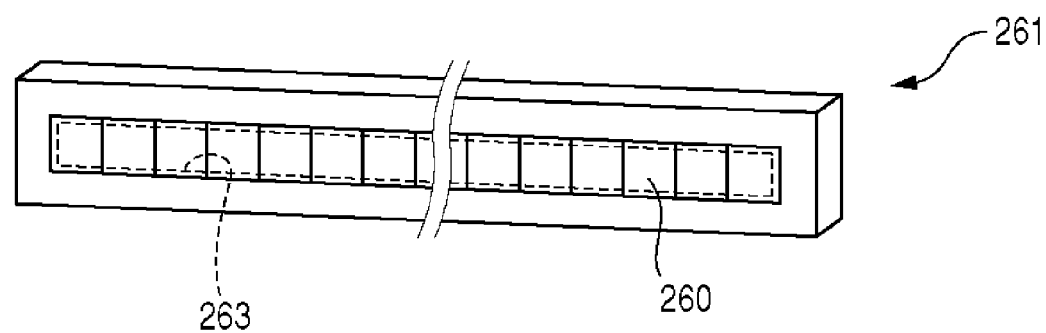
FIG. 3 is a perspective view showing a line sensor according to the embodiment.

FIG. 3 is a perspective view showing the line sensor 261 according to the embodiment. The line sensor 261 is a one-dimensional imaging sensor in which pixels 260 that convert a received-light quantity into an electrical physical quantity are arrayed in a linear manner. The line sensor 261 has 64 pixels 260 as effective pixels. In the line sensor 261, a light-receiving area 263 is formed by these 64 pixels 260. The line sensor 261 is mounted so as to face a bowl surface 150 of the bowl 151. In the absence of a shielding object such as the hand in the angular field of view of the line sensor 261, the bowl surface 150 is covered by the imaging range of the line sensor 261.

Every time the line sensor 261 performs a light-receiving operation, the line sensor 261 outputs imaging data. The imaging data output by the line sensor 261 is one-dimensional digital data where pixel values of 256 tones that express a received-light quantity are arrayed in the order of respective pixels 260. The line sensor 261 is provided with an electronic shutter (not shown). The line sensor 261 can avoid saturation of a received-light quantity in each pixel 260 in the image data by adjusting the exposure time using the electronic shutter.

Figure 4:
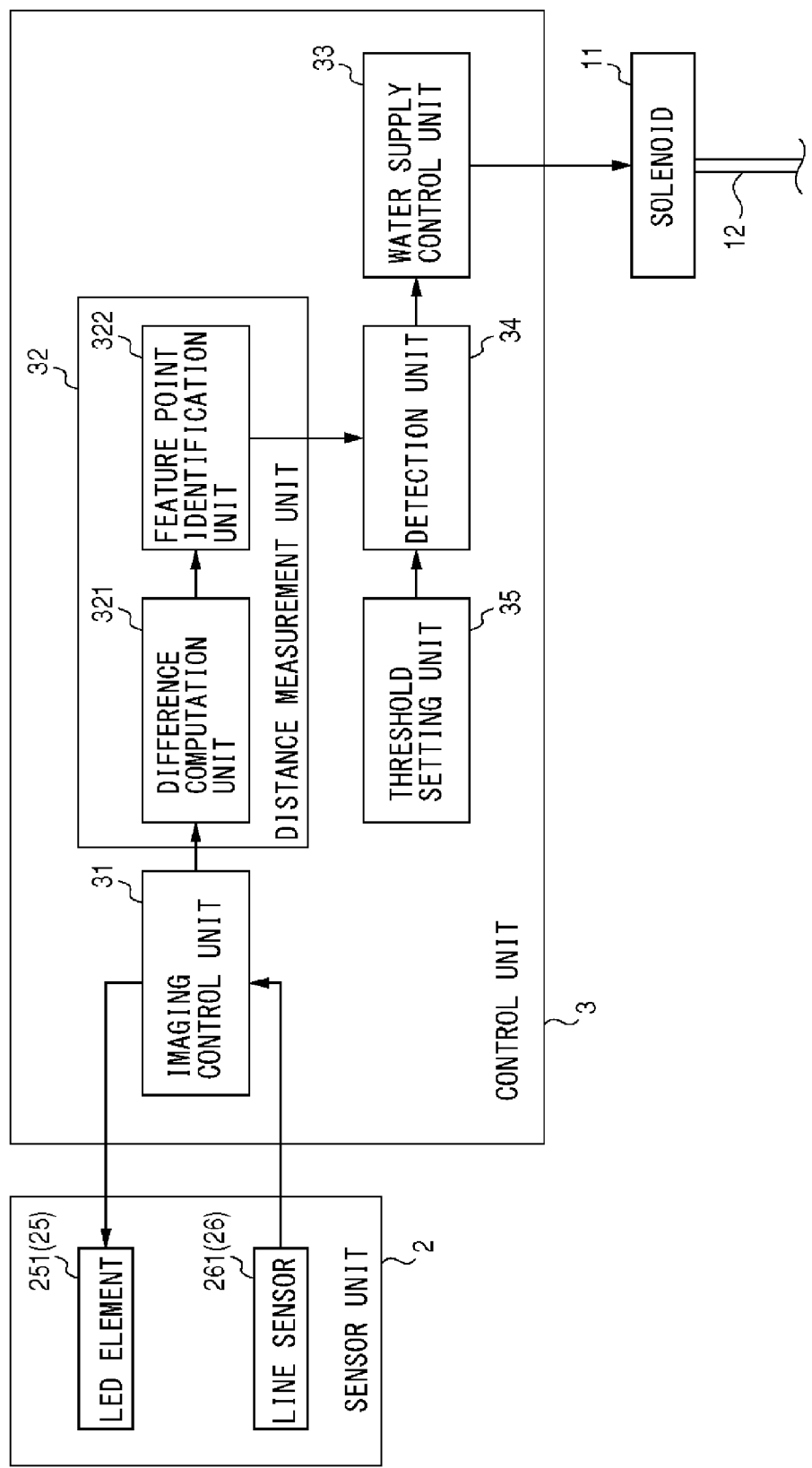
FIG. 4 is a schematic diagram showing a functional configuration of a control unit according to the embodiment.

FIG. 4 is a schematic diagram showing a functional configuration of the control unit 3 according to the embodiment. The control unit 3 operates by power supplied from a commercial power source and controls the sensor unit 2 and the solenoid 11. To implement this control the control unit 3 is provided with an imaging control unit 31, a distance measurement unit 32, a water supply control unit 33, a detection unit 34, and a threshold setting unit 35.

The imaging control unit 31 controls the line sensor 261 and the LED element 251 in the imaging unit 26. More specifically, the imaging control unit 31 controls the line sensor 261 such that an intermittent operation where an operation period and a non-operation period appear alternately is performed and causes the LED element 251 to emit light in an operation period. By way of a non-limiting example, the imaging control unit 31 controls the line sensor 261 by setting an operation period and a non-operation period that appear alternately every 0.3 to 0.5 seconds. The imaging control unit 31 stops power supply to the line sensor 261 until a predetermined interval time passes after a previous operation period has ended so as to set a non-operation period and restarts the power supply when the interval time has passed so as to set an operation period.

The imaging control unit 31 controls the line sensor 261 to perform two light-receiving operations in a single operation period. The first of these two light-receiving operations is performed without emitting light from the LED element 251. The second of these two light-receiving operations is performed while emitting light from the LED element 251. The imaging control unit 31 controls the line sensor 261 to output imaging data in response to each light-receiving operation.

The distance measurement unit 32 measures the distance from the line sensor 261 to a measure-distance target based on the image data captured by the line sensor 261. For implementation of distance measurement, the distance measurement unit 32 is provided with a difference computation unit 321 and a feature point identification unit 322. A description will be given below of the difference computation unit 321 and the feature point identification unit 322 in the distance measurement unit 32.

Figure 5:
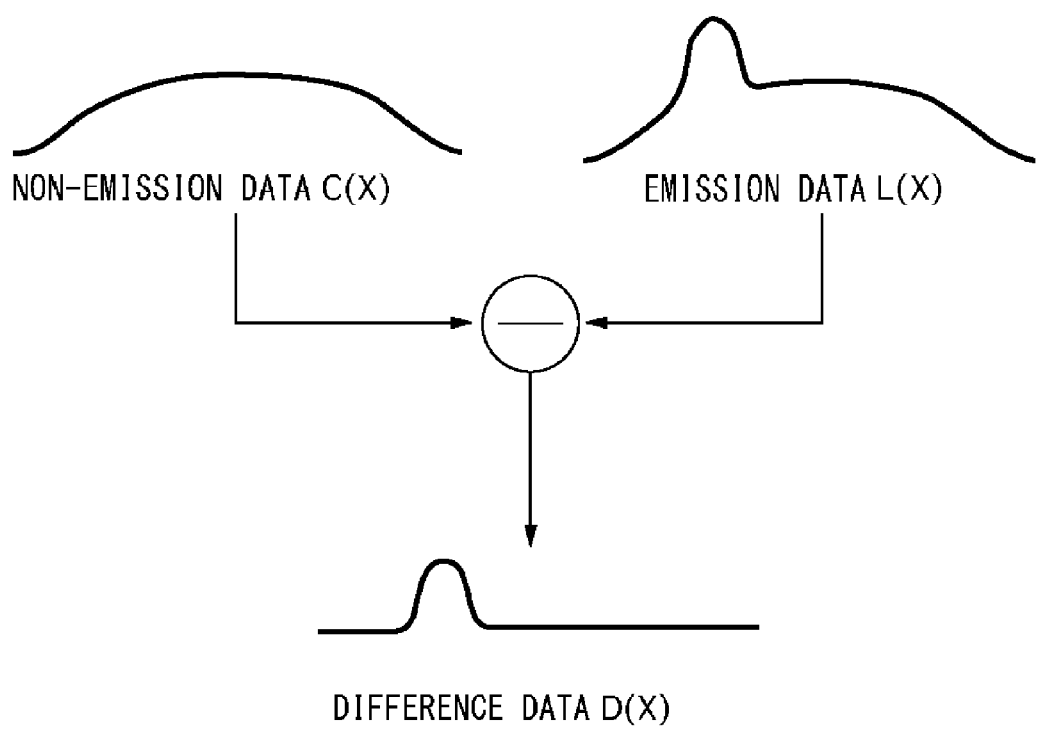
FIG. 5 is a graph showing steps for generating difference data performed by a difference computation unit according to the embodiment.

FIG. 5 is a graph showing steps for generating difference data performed by the difference computation unit 321 according to the embodiment. The difference computation unit 321 imports non-emission data $C(x)$ and emission-data $L(x)$, the non-emission data $C(x)$ being image data generated in the first light-receiving operation performed while the LED element 251 does not emit light, and the emission data $L(x)$ being image data generated in the second light-receiving operation performed under LED light (light projected from the LED element 251). The difference computation unit 321 records the imported data in a working memory (not shown).

The difference computation unit 321 substrates the non-emission data $C(x)$ from the emission data $L(x)$ recorded in the working memory so as to derive difference data $D(x)$ therebetween. It should be noted that x represents a pixel number between 0 and 63, and $L(n)$, etc. represents a pixel value of a pixel of a pixel number n. The difference data $D(x)$ derived by subtracting the non-emission data $C(x)$ resulting only from ambient light from the emission data $L(x)$ resulting from the LED light in addition to ambient light represents components of reflected light dependent on the LED light in which influence from ambient light is suppressed.

The feature point identification unit 322 computes the position of a feature point in the difference data $D(x)$ obtained by the difference computation unit 321. The term "the position of a feature point of the difference data $D(x)$" refers to a position in the difference data $D(x)$ used to measure the distance to a measure-distance target. More specifically, the position of a feature point in the difference data $D(x)$ is represented by the position on the line sensor 261 corresponding to a position in the difference data $D(x)$. A position on the line sensor 261 is represented by, for example, a pixel number of the line sensor 261. The pixel number of the line sensor 261 may not necessarily be an integer but may be a real value representing a sub-pixel.

The feature point in the difference data $D(x)$ computed by the feature point identification unit 322 may be any point so long as it can be used to measure the distance to a measure-distance target. For example, the feature point may be a point corresponding to a mode, median, or centroid identified when the difference data D(x) is viewed as frequency distribution. For the purpose of reducing computational load, the feature point identification unit 322 according to the embodiment defines the position of centroid computed by a simple computational method as a feature point. The method of computation will be described below with reference to FIG. 6 in which pixel numbers x are plotted on the horizontal axis and pixel values (received-light quantities) D(x) are plotted on the vertical axis.

Figure 6:
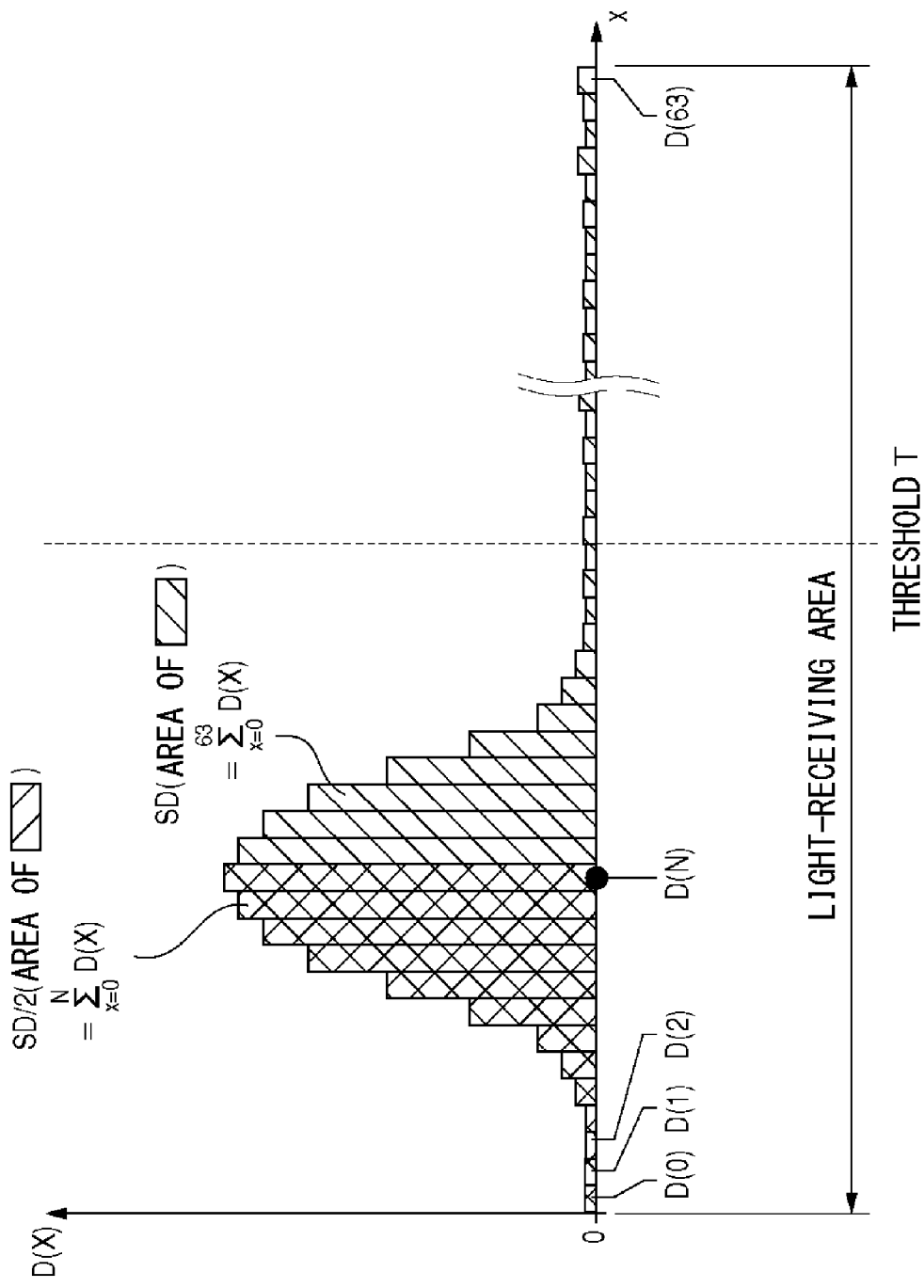
FIG. 6 illustrates exemplary steps for computing a feature point in the difference data performed by a feature point identification unit according to the embodiment.

FIG. 6 illustrates exemplary steps for computing a feature point in the difference data D(x) performed by the feature point identification unit 322 according to the embodiment. FIG. 6 is a graph in which a horizontal axis represents x, i.e., a pixel number of the line sensor 261 and a vertical axis represents the value of the difference data D(x) (a function of x), i.e., a light quantity of reflected light.

The feature point identification unit 322 first integrates the difference data D(x) so as to calculate the sum SD of the pixel values of the 64 pixels of the line sensor 261. In FIG. 6, the sum SD corresponds to the area of a region indicated by hatching with diagonal lines running to the upper right. The feature point identification unit 322 integrates the pixel values of the respective pixels 260 in order from a pixel on the extreme left in the light-receiving area 263 whose pixel number is zero and identifies a pixel position (shown by a black filled circle) at which an integrated value reaches SD/2 as the position of the centroid of the difference data D(x). In FIG. 6, the integrated value of SD/2 corresponds to the area of a region indicated by hatching with diagonal lines running to the lower right. This region is encompassed by the region for the sum SD and is understood as a region with crosshatching in FIG. 6. "Threshold T" in FIG. 6 will be discussed later.

The difference data D(x) for reflected light from a measure-distance target (e.g., the user's hand or dishes to do such as tea bowls) generally exhibits a mound-shaped distribution. The feature point (e.g., the position of the centroid) in the difference data D(x) varies depending on the distance from the imaging unit 26 to the measure-distance target.

Figure 7:
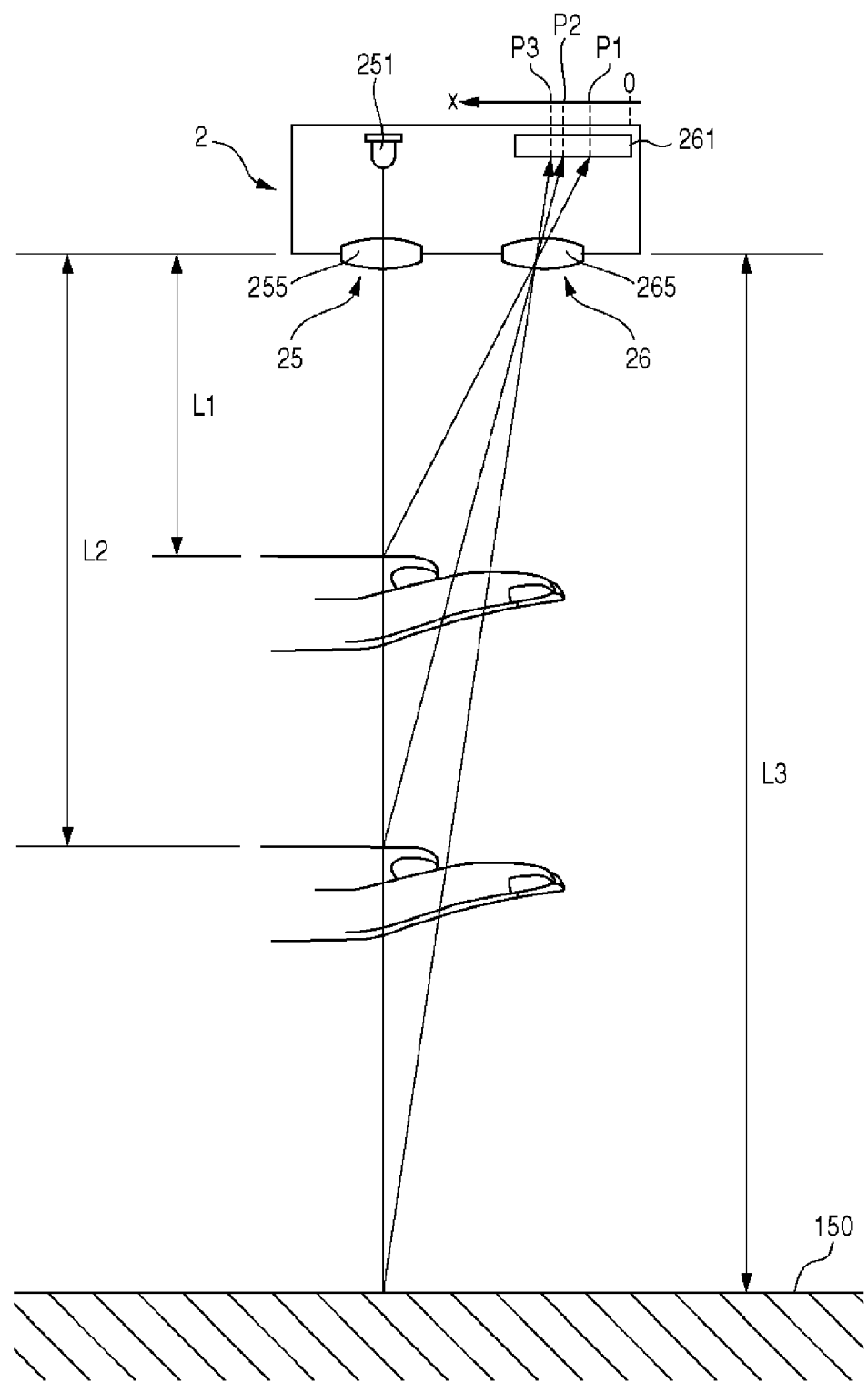
FIG. 7 shows a relationship between the distance from a measure-distance target is measured and an imaging unit, and the position of the feature point in the difference data.

FIG. 7 shows a relationship between the distance from the measure-distance target and the imaging unit 26, and the position of the feature point in the difference data D(x). FIG. 7 schematically shows the relative positions of the sensor unit 2 in the sink 15 shown in FIG. 1, the bowl surface 150 of the bowl 151, and the user's hand. As shown in FIG. 7, the position where the light from the hand (measure-distance target) reflecting the LED light projected by the LED element 251 is incident on the line sensor 261 varies depending on the distance between the imaging unit 26 and the measure-distance target.

The shorter the distance between the imaging unit 26 and the measure-distance target, the further the incident position on the line sensor 261 is located toward right in FIG. 7. The longer the distance, the incident position is located toward left. More specifically, when the distance between the imaging unit 26 and the measure-distance target is L1, the reflected light will be incident on point P1 on the line sensor 261. If the distance between the imaging unit 26 and the measure-distance target is L2 longer than L1, the reflected light will be incident on point P2 on the line sensor 261. Referring to FIG. 7, point P2 is located left of point P1. The x axis that extends from left to right in FIG. 6 extends from right to left in FIG. 7. Therefore, the shorter the distance between the imaging unit 26 and the measure-distance target, the smaller the x coordinate of the feature point in the difference data D(x) for the reflected light. In other words, the distance between the imaging unit 26 and the measure-distance target, and the value of x coordinate of the centroid (feature point) in the line sensor 261 are in one-to-one correspondence.

Based on the foregoing, the feature point identification unit 322 can identify the distance between the imaging unit 26 and the measure-distance target, by identifying the x coordinate of the feature point in the difference data D(x) for the reflected light from the measure-distance target. In FIG. 7, L3 denotes distance from the imaging unit 26 to the bowl surface 150.

A description with reference to FIG. 4 is continued. The threshold setting unit 35 sets a threshold T for distance L measured by the distance measurement unit 32. If the distance L measured by the feature point identification unit 322 in the distance measurement unit 32 is smaller than threshold T set by the threshold setting unit 35, the detection unit 34 identifies the measure-distance target as a detection object. Meanwhile, if the distance L measured by the feature point identification unit 322 is equal to or greater than threshold T set by the threshold setting unit 35, the detection unit 34 does not identify, i.e., detect a detection object. Therefore, the threshold T set by the threshold setting unit 35 represents a detection object identification threshold defined to determine whether the detection unit 34 identifies the measure-distance target as a detection object. If the value of threshold T is greater, the region in which the detection unit 34 identifies the measure-distance target as a detection object is more extensive than when the value is smaller. The threshold setting unit 35 can set the threshold T by setting a pixel number (including a sub-pixel) of the line sensor 261.

The water supply control unit 33 opens the solenoid 11 in response to the detection unit 34 detecting a detection object, causing the automatic water faucet 16 to discharge water. During intervals when the detection unit 34 is detecting a detection object, the water supply control unit 33 continues to discharge water. The water supply control unit 33 closes the solenoid 11 in response to the detection unit 34 not detecting a detection object, causing the automatic water faucet 16 to stop discharging water. During intervals when the detection unit 34 is not detecting a detection object, the water supply control unit 33 continues to stop discharging water. Thus, the water supply control unit 33 controls the supply of water from the automatic water faucet 16 in accordance with the result of detection by the detection unit 34. Accordingly, the threshold T set by the threshold setting unit 35 functions as a water faucet control threshold defined to determine whether the water supply control unit 33 causes the automatic water faucet 16 to supply water or stop discharging water. The greater the threshold T, the easier it is for the automatic water faucet 16 to supply water. The smaller the threshold T, the easier it is for the automatic water faucet 16 to stop discharging water.

As mentioned above, the sink 15 according to the embodiment is provided in a kitchen, etc. and is assumed to be used to wash dishes, etc. If the detection by the detection unit 34 or absence thereof is used to control water supply, usability for the user washing dishes varies significantly depending on the value of the threshold T (i.e., detection object identification threshold). For example, if the threshold T is set to be small so as to narrow the detection range of the detection unit 34, erroneous detection due to specular reflection from dishes placed in the sink 15 or accumulated water is less likely to occur. However, the likelihood of the detection object being leaving the detection range of the detection unit 34 while, for example, the user is washing a large dish is increased so that the likelihood that the supply of water is stopped in a way unwanted by the user is increased.

Meanwhile, if the threshold T is set to be large so as to broaden the detection range of the detection unit 34, it is less likely that the supply of water is stopped in a manner unwanted by the user but erroneous detection due to specular reflection is more likely to occur.

Accordingly, the threshold setting unit 35 according to the embodiment uses hysteresis to set the threshold T (detection object identification threshold). More specifically, the threshold setting unit 35 increases the threshold T in response to the detection unit 34 detecting a detection object. Further, the threshold setting unit 35 decreases the threshold T in response to the detection unit 34 not detecting a detection object.

Once the detection unit 34 detects a detection object as the user starts washing dishes etc., the threshold setting unit 35 increases the threshold T. This broadens the detection range of the detection unit 34, reduces the likelihood that the detection object leaves the detection range of the detection unit 34 while the user is washing dishes, and reduces the likelihood that the supply of water is stopped in a way unwanted by the user.

When the detection unit 34 no longer detects a detection object as the user finishes washing dishes, the threshold setting unit 35 decreases the threshold T. This narrows the detection range of the detection unit 34 and reduces the likelihood that the detection unit 34 erroneously detects a detection object that is not present. Consequently, the likelihood that water is supplied in a way unwanted by the user is reduced.

A detailed description will now be given of the threshold set by the threshold setting unit 35 according to the embodiment.

When the sink 15 provided with the automatic water faucet 16 according to the embodiment is installed in a kitchen, etc. and power is supplied to the control unit 3, the threshold setting unit 35 sets a first threshold T1 as a default value of the threshold T (detection object identification threshold). The first threshold T1 is a threshold set by the threshold setting unit 35 when the detection unit 34 does not detect a detection object. Further, the threshold setting unit 35 sets a second threshold greater than the first threshold during intervals when the detection unit 34 is detecting a detection object.

Specific values of the first threshold T1 and the second threshold T2 may be determined experimentally by considering the distance from the water discharge port 168 of the automatic water faucet 16 to the counter top 156 of the sink 15, the distance from the water discharge port 168 to the bowl 151, and a usage situation assumed. By way of example, the first threshold T1 is set to a pixel number of the line sensor 261 such that the detection range of the detection unit 34 extends to a distance between 80 mm and 140 mm from the water discharge port 168. If the detection range of the detection unit 34 extends to a distance shorter than 80 mm from the water discharge port 168, the detection unit 34 cannot identify a detection object and water is not discharged unless the object is drawn quite near the water discharge port 168. Consequently, usability is lowered. If the detection range of the detection unit 34 extends to a distance longer than 140 mm from the water discharge port 168, the likelihood that a pan in the bowl 151 of the sink 15 or shimmering water accumulated in the pan is erroneously detected by the detection unit 34 as a detection object is increased so that usability for the user is lowered.

By setting the first threshold T1 such that the detection range of the detection unit 34 extends to a distance between 80 mm and 140 mm from the water discharge port 168, the detection range of the detection unit 34 will extend to a distance shorter than the distance from the water discharge port 168 to the overflow edge of the sink 15 in which water discharged from the automatic water faucet 16 is accumulated. This prevents the detection range of the detection unit 34 from detecting the reflected light from, for example, water accumulated in the bowl 151 of the sink 15 and reduces the likelihood of unwanted water supply.

By way of example, the second threshold is set to a pixel number of line sensor 261 such that the detection range of the detection unit 34 extends to a distance between 160 mm and 240 mm from the water discharge port 168. If the detection range of the detection unit 34 extends to a distance shorter than 160 mm from the water discharge port 168, the likelihood that the supply of water is stopped in a way unwanted by the user washing dishes is increased so that usability for the user is lowered. If the detection range of the detection unit 34 extends to a distance longer than 240 mm from the water discharge port 168, the likelihood of dishes, etc. piled up in the bowl 151 of the sink 15 being detected and the state of unwanted water supply being continued is increased.

If the second threshold T2 is set such that the detection range of the detection unit 34 extends to a distance between 160 mm and 240 mm from the water discharge port 168, the detection range of the detection unit 34 will extend to a distance longer than the distance from the water discharge port 168 to the overflow edge of the sink 15 in which water discharged from the automatic water faucet 16 is accumulated. The upper limit of the value to which the second threshold T2 is set is smaller than the distance from the water discharge port 168 to the bowl surface 150 of the bowl 151 (L3 in FIG. 7).

Figure 8:
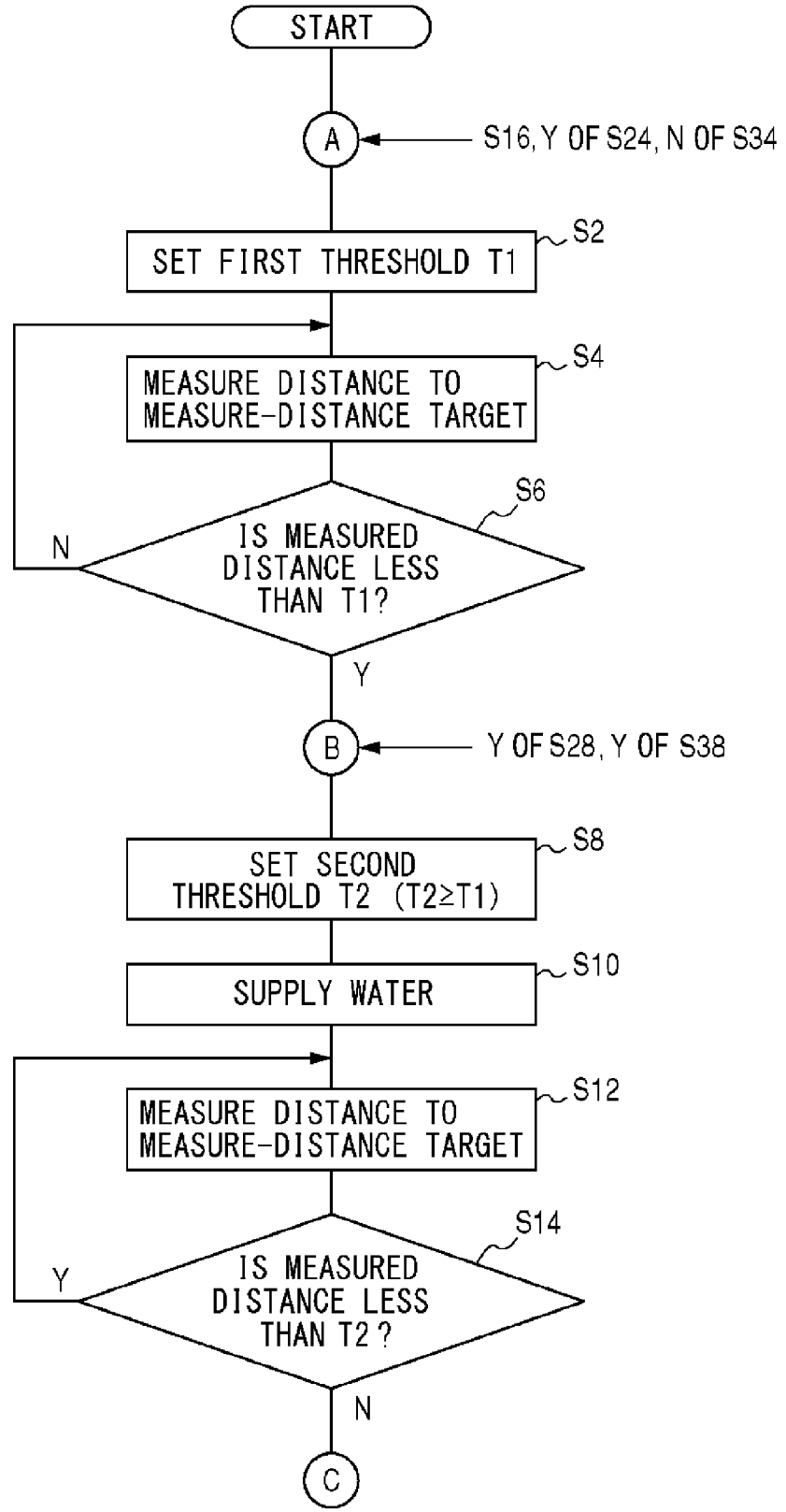
FIG. 8 shows the first half of a flowchart illustrating the flow of water supply control performed by the control unit according to the embodiment.

FIG. 8 shows the first half of a flowchart, illustrating the flow of water supply control performed by the control unit 3 according to the embodiment. The process in the flowchart is started when power is supplied to the control unit 3.

The threshold setting unit 35 sets the first threshold T1 (S2). The distance measurement unit 32 measures the distance to the measure-distance target based on the difference data D(x) for reflected light from the measure-distance target (S4). While the distance to the measure-distance target is equal to or greater than the first threshold T1 ("N" in S6), the detection unit 34 does not detect a detection object. The water supply control unit 33 does not cause the automatic water faucet 16 to discharge water. Control is returned to step S4 so that measurement of the distance to the measure-distance target is continued.

If the distance to the measure-distance target is smaller than the first threshold T1 ("Y" in S6), the detection unit 34 detects the measure-distance target as a detection object. Measurement of the distance to the measure-distance target (S4) and determination as to whether the distance to the measure-distance target is smaller than the first threshold T1 may be repeated several times so as to increase the reliability of determination. The threshold setting unit 35 sets the second threshold T2 (S8). The second threshold T2 set by the threshold setting unit 35 in response to the detection unit 34 detecting a detection object is greater than the first threshold T1 set when the detection unit 34 does not detect a detection object.

The water supply control unit 33 opens the solenoid 11 and causes the automatic water faucet 16 to supply water in response to the detection unit 34 detecting a detection object (S10). Even while the automatic water faucet 16 is supplying water, the distance measurement unit 32 measures the distance to the measure-distance target (S12). While the distance to the measure-distance target is less than the second threshold T2 ("Y" in S14), the detection unit 34 is continuing to detect a detection object so that the water supply control unit 33 continues to cause the automatic water faucet 16 to supply water.

When the distance to the measure-distance target becomes equal to or greater than the second threshold T2 ("N" in S14), control of the flow is turned to C shown in FIGS. 9A-9C.

FIGS. 9A-9C show the second half of the flowchart, illustrating the flow of threshold control performed by the control unit 3 according to the embodiment.

FIG. 9A shows the second half of the flowchart, illustrating the first example of water control performed by the control unit 3. In the flowchart shown in FIG. 9A, the water supply control unit 33 closes the solenoid 11 and causes the automatic water faucet 16 to stop supplying water when the distance to the measure-distance target is equal to or greater than the second threshold T2 (S16). When the water supply control unit 33 causes the automatic water faucet 16 to stop supplying water, control of the flow is returned to A shown in FIG. 8 so that step S2, for setting the first threshold, through step S16, for stopping water supply, are repeated.

FIG. 9A is a flowchart showing an example where the threshold setting unit 35 returns the threshold value T to the first threshold T1 immediately when the detection unit 34 no longer detects the detection object having been under detection. The detection unit 34 may no longer detect the detection object having been under detection when the user finished washing dishes so that the detection object is no longer located in the bowl 151 of the sink 15. Another conceivable situation is that the measure-distance target temporarily leaves the detection range of the detection unit 34 for the reason that the user moves the dishes significantly while washing the dishes. In this, the user may experience inconvenience of having to drawing the hand etc. near the water discharge port 168, if the threshold T is set to the first threshold T1.

To address this, the threshold setting unit 35 may set a third threshold T3 (T1<T3≤T2), if the detection unit 34 no longer detects the detection object having been under detection and during an interval until a predetermined period of time elapses and set the first threshold T1 after the elapse of the predetermined period of time. This allows water supply to be resumed easily even when the user causes the supply of water to be stopped for some reason while continuing to wash dishes. Consequently, usability is improved.

The user can supply water without drawing the hand or the like near the water discharge port 168 even when the supply of water is stopped for some reason while the user continues to wash dishes. Consequently, usability is improved. Thus, "a predetermined period of time" may be referred to as "threshold change suspension period" defined to provide the convenience of resuming the supply of water immediately when the supply of water is stopped in a way unwanted by the user. The specific duration of the threshold change suspension period may be experimentally determined in consideration of the usage mode of the automatic water faucet 16 assumed. The third threshold T3 may not be smaller than the second threshold T2, and the third threshold T3 may be identical to the second threshold T2.

By way of another example, the threshold setting unit 35 may set the threshold varying it from the second threshold T2 until it reaches the first threshold T1 continuously or in steps when the detection unit 34 no longer detects the detection object having been under detection. In this case, as well as in the case of setting the third threshold T3 described above, water supply can be easily resumed easily even when the user causes the supply of water to be stopped for some reason while continuing to wash dishes. Consequently, usability is improved.

FIG. 9B shows the second half of a flowchart illustrating the second example of water supply control performed by the control unit 3. According to the flowchart shown in FIG. 9B, as in the case of the flowchart shown in FIG. 9A, the water supply control unit 33 closes the solenoid 11 to cause the automatic water faucet 16 to stop supplying water when the distance to the measure-distance target is equal to or greater than the second threshold T2 (S18).

The threshold setting unit 35 sets the third threshold T3 (T1<T3≤T2) in response to the detection unit no longer detecting the detection object having been under detection (S20). The threshold setting unit 35 starts a timer (not shown) (S22).

Until the predetermined threshold change suspension period elapses since start of the timer ("N" in S24), the distance measurement unit 32 measures the distance to the measure-distance target (S26). If the distance that the distance measurement unit 32 measures is greater than the third threshold T3 ("N" in S28), control is returned to step S24 where a determination is made as to whether the period has elapsed. If the distance that the distance measurement unit 32 measures is less than the third threshold T3 ("Y" in S28), control of the flow is returned to B shown in FIG. 8. As a result, the threshold T is set to the second threshold T2 and the automatic water faucet 16 supplies water.

When the threshold change suspension period elapses since the start of the timer ("Y" in S24), control of the flow is returned to A shown in FIG. 8. As a result, the threshold T is set to the first threshold T1 and the state of the automatic water faucet 16 stopping water supply is established.

FIG. 9C shows the second half of a flowchart illustrating the third example of water supply control performed by the control unit 3. According to the flowchart shown in FIG. 9C, as in the case of the flowchart shown in FIG. 9A, the water supply control unit 33 closes the solenoid 11 to cause the automatic water faucet 16 to stop supplying water when the distance to the measure-distance target is equal to or greater than the second threshold T2 (S30).

The threshold setting unit 35 changes the value of the threshold T currently set to T−ΔT (S32). ΔT represents the amount of changing the threshold T used to change the value of the threshold T and is defined such that 0<ΔT<T2−T1. By way of one example, ΔT is a value obtained by equally dividing the difference between the second threshold T2 and the first threshold T1 by 6, i.e. ΔT=(T2−T1)/6. In this case, the threshold T reaches the first threshold T1 if step S32 for correcting the threshold T is repeated 6 times. If the value of the threshold T is less than the first threshold T1 as a result of changing the value of the threshold T to T−ΔT, the threshold setting unit 35 rounds out to the first threshold T1.

As described above, the imaging control unit 31 controls the line sensor 261 by setting an operation period and a non-operation period that appear alternately every 0.3 to 0.5 seconds. Therefore, the distance measurement unit 32 is capable of obtaining the difference data D(x) every 0.6 to 1.0 seconds. Therefore, the time required for the distance measurement unit 32 to measure the distance to the measure-distance target is 0.6 to 1.0 seconds. By ensuring that ΔT=(T2−T1)/6, the time required for the threshold T to return from the second threshold T2 to the first threshold T1 will be 3.0 to 5.0 seconds, which is substantially equal to the specific example given above of the threshold change suspension period. Thus, the amount of change ΔT of the threshold T may be defined based on the time required to close the solenoid 11 and the imaging period of the imaging unit 26.

A description with reference to FIG. 9C is continued. If the value of the threshold T changed by the threshold setting unit 35 is greater than the first threshold T1 ("Y" in S34), the distance measurement unit 32 measures the distance to the measure-distance target (S36). If the distance that the distance measurement unit 32 measures is greater than the currently set threshold T ("N" in S38), control is returned to step S32 for correcting the threshold T. If the distance that the distance measurement unit 32 measures is less than the third threshold T3 ("Y" in S38), control of the flow is returned to B shown in FIG. 8. As a result, the threshold T is set to the second threshold T2 and the automatic water faucet 16 supplies water.

If the value of the threshold T changed by the threshold setting unit 35 becomes the first threshold T1 ("N" in S34), control of the flow is returned to A shown in FIG. 8. As a result, the threshold T is set to the first threshold T1 and the state of the automatic water faucet 16 stopping water supply is established.

Figure 10A:
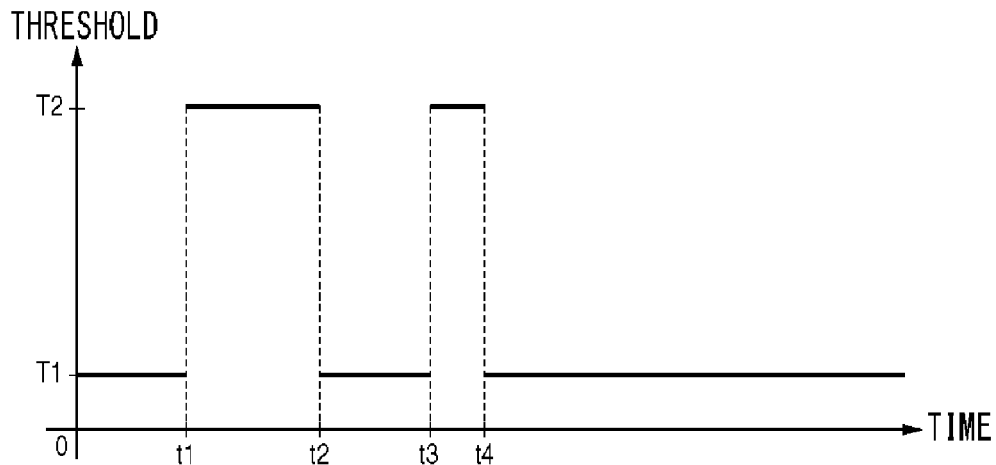
FIGS. 10A-10C show temporal change of the threshold resulting from water supply control performed by the control unit according to the embodiment.
Figure 10B:
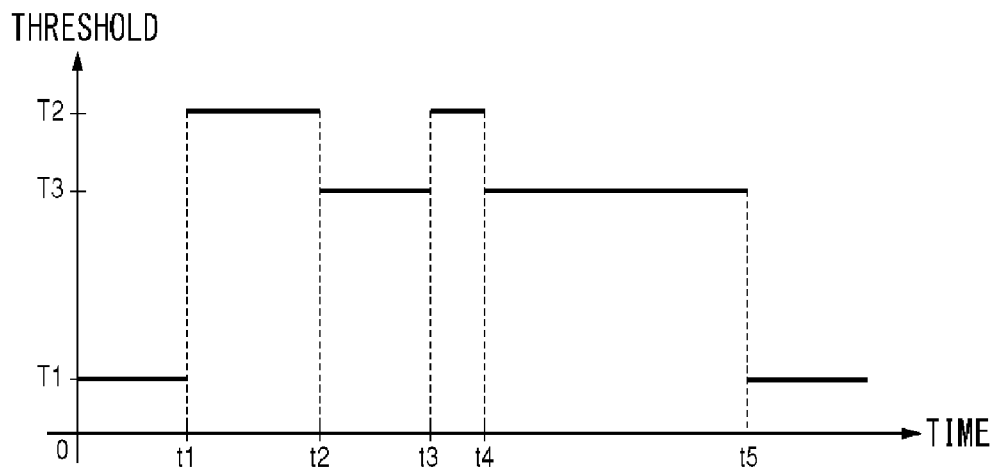
Figure 10C:
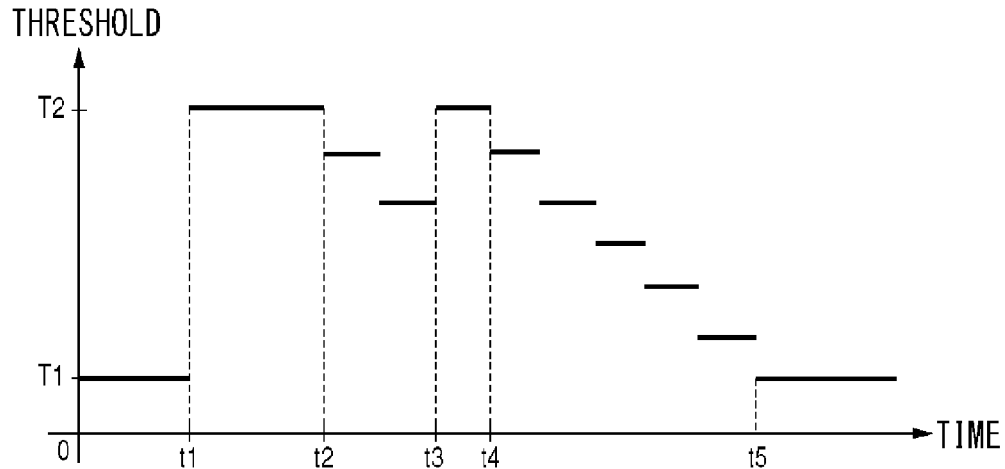

FIGS. 10A-10C show temporal change of the threshold T resulting from water supply control performed by the control unit 3 according to the embodiment. More specifically, FIG. 10A is a graph showing temporal change of the threshold T resulting from water supply control according to the first example shown in FIG. 9A.

FIG. 10 shows that the threshold setting unit 35 changes the value of the threshold T from the first threshold T1 to the second threshold T2 in response to the detection unit 34 detecting a detection object at time t1. Then, at time t2, the detection unit 34 no longer detects a detection object so that the threshold setting unit 35 changes the value of the threshold T from the second threshold T2 to the first threshold T1. Then, at time t3, the detection unit 34 detects a detection object so that the threshold setting unit 35 changes the value of the threshold T to the second threshold T2. At time t4, the detection unit 34 no longer detects a detection object so that the threshold setting unit 35 returns the value of the threshold T to the first threshold T1. Referring to FIG. 10A, the automatic water faucet 16 supplies water between time t1 and time t2 and between time t3 and time t4. During the other periods, the automatic water faucet 16 does not supply water.

FIG. 10B is a graph showing temporal change of the threshold T resulting from water supply control according to the second example shown in FIG. 9B. As in the case of FIG. 10A, the threshold setting unit 35 changes the value of the threshold T from the first threshold T1 to the second threshold T2 in response to the detection unit 34 detecting a detection object at time t1. Then, at time t2, the detection unit 34 no longer detects a detection object so that the threshold setting unit 35 changes the value of the threshold T from the second threshold T2 to the first threshold T1. Then, at time t3, the detection unit 34 detects a detection object so that the threshold setting unit 35 changes the value of the threshold T to the second threshold T2. At time t4, the detection unit 34 no longer detects a detection object so that the threshold setting unit 35 returns the value of the threshold T to the first threshold T1. At time t5, the threshold change suspension period elapsed during intervals when the detection unit 34 is not detecting a detection object so that the threshold setting unit 35 returns the value of the threshold T to the first threshold T1.

In FIG. 10B, as in the case of FIG. 10A, the automatic water faucet 16 does not supply water between time t1 and time t2 and between time t3 and time t4. In FIG. 10B, however, the automatic water faucet 16 is placed in a state in which change in the threshold is suspended between time t2 and time t3 and between time t4 and t5. During the other periods, i.e., between time 0 and time t1 and after time t5, the automatic water faucet 16 does not supply water.

FIG. 10C is a graph showing temporal change in the threshold T resulting from water supply control according to the third example shown in FIG. 9C. As in the case of FIG. 10A, the threshold setting unit 35 changes the value of the threshold T from the first threshold T1 to the second threshold T2 in response to the detection unit 34 detecting a detection object at time t1. Then, at time t2, the detection unit 34 no longer detects a detection object so that the threshold setting unit 35 repeats the step of changing the value of the threshold T to T=T−ΔT twice until time t3.

At time t3, the detection unit 34 detects a detection object so that the threshold setting unit 35 changes the value of the threshold T to the second threshold T2 again. At time t4, the detection unit 34 no longer detects a detection object so that the threshold setting unit 35 repeats subtracting from the threshold T until the value of the threshold T reaches the first threshold T1. At time t5, the value of the threshold T is set to the first threshold T1.

In FIG. 10C, as in the case of FIG. 10A, the automatic water faucet 16 supplies water between time t1 and time t2 and between time t3 and time t4. In FIG. 10C, however, the automatic water faucet 16 is placed in a state in which the threshold is being changed between time t2 and time t3 and between time t4 and time t5. During the other periods, i.e., between time 0 and time t1 and after time t5, the automatic water faucet 16 does not supply water.

As described above, usability experienced by the user during water supply control using a person-detecting sensor is improved by using the automatic water faucet according to the embodiment.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The invention according to the embodiment may be defined by the following items.

(Items)

A detection sensor comprising: a distance measurement unit that measures a distance from a discharge water port and a measure-distance target;

a threshold setting unit that sets a threshold for distance; and a detection unit that detects the measure-distance target as a detection object if the distance that the distance measurement unit measures is shorter than the threshold set by the threshold setting unit and does not detect a detection object if the distance that the distance measurement unit measures is equal to or greater than the threshold set by the threshold setting unit, wherein the threshold setting unit sets the first threshold, which is set for a period when the detection unit is not detecting a detection object, to a value smaller than a second threshold, which is set for a period when the detection unit is detecting a detection object.

An automatic water faucet comprising:

a water faucet;

an imaging unit provided in a water discharge port of the water faucet and that images light reflected from a measure-distance target;

a distance measurement unit that measures distance from the imaging unit to the measure-distance target based on image data captured by the imaging unit;

a threshold setting unit that sets a threshold for distance;

a detection unit that detects the measure-distance target as a detection object if the distance that the distance measurement unit measures is shorter than the threshold set by the threshold setting unit; and a water supply control unit that causes the water faucet to discharge water in response to the detection unit detecting a detection object, and causes the water faucet to stop supplying water in response to the detection unit not detecting a detection object. The threshold setting unit increases the threshold setting in response to the detection unit detecting a detection object.

According to this embodiment, once the detection unit detects a detection object as the user starts washing dishes etc., the threshold setting unit increases the threshold setting. This broadens the detection range of the detection unit, reduces the likelihood that the detection object leaves the detection range of the detection unit while the user is washing dishes, and reduces the likelihood that the supply of water is stopped in a way unwanted by the user. As a result, usability experienced by the user is improved.

The detection unit does not detect a detection object if the distance that the distance measurement unit measures is equal to or greater than the threshold set by the threshold setting unit. The threshold setting unit may decrease the threshold setting in response to the detection unit not detecting a detection object. In this case, the threshold setting unit decreases the threshold setting when the detection unit no longer detects a detection object as the user finishes washing the dishes. This narrows the detection range of the detection unit and reduces the likelihood that the detection unit erroneously detects a detection object that is not present. As a result, the likelihood that water is supplied in a way unwanted by the user is reduced and usability experienced by the user is improved.

The threshold setting unit may: (1) set a first threshold during intervals when the detection unit is not detecting a detection object; (2) set a second threshold greater than the first threshold during intervals when the detection unit is detecting a detection object; (3) when the detection unit no longer detects a detection object having been under detection, set a third threshold greater than the first threshold and equal to or less than the second threshold during an interval until a predetermined period of time elapses; and (4) set the first threshold after the predetermined period of time elapses. This allows water supply to be resumed without requiring the user to draw the hand or the like near the water discharge port even when the user causes the supply of water to be stopped for some reason while continuing to wash dishes. Consequently, usability is improved.

The threshold setting unit may: (1) set a first threshold during intervals when the detection unit is not detecting a detection object; (2) set a second threshold greater than the first threshold during intervals when the detection unit is detecting a detection object; and (3) when the detection unit no longer detects a detection object having been under detection, sets the threshold varying it from the second threshold until it reaches the first threshold. This allows water supply to be resumed without requiring the user to draw the hand or the like near the water discharge port even when the user causes the supply of water to be stopped for some reason while continuing to wash dishes. Consequently, usability is improved.

The threshold setting unit may set as the first threshold a value smaller than distance from an overflow edge of a sink in which water discharged from the water faucet accumulates to the water discharge port, and set as the second threshold a value greater than the distance from the overflow edge to the water discharge port. This prevents the detection range from detecting the reflected light from, for example, water accumulated in the bowl of the sink when the detection unit is not detecting a detection object and reduces the likelihood of unwanted water supply.

What is claimed is:

1. An automatic water faucet comprising:
a water faucet;
an imaging unit provided in a water discharge port of the water faucet and that images light reflected from a measure-distance target;
a distance measurement unit that measures distance from the imaging unit to the measure-distance target, based on image data captured by the imaging unit;
a threshold setting unit that sets a threshold for distance;
a detection unit that detects the measure-distance target as a detection object if the distance that the distance measurement unit measures is shorter than the threshold set by the threshold setting unit; and
a water supply control unit that causes the water faucet to discharge water in response to the detection unit detecting a detection object, and causes the water faucet to stop supplying water in response to the detection unit not detecting a detection object; wherein
the threshold setting unit increases the threshold setting in response to the detection unit detecting a detection object.

2. The automatic water faucet according to claim 1, wherein:
the detection unit does not detect a detection object if the distance that the distance measurement unit measures is equal to or greater than the threshold set by the threshold setting unit; and
the threshold setting unit decreases the threshold setting in response to the detection unit not detecting a detection object.

3. The automatic water faucet according to claim 1, wherein the threshold setting unit:
(1) sets a first threshold during intervals when the detection unit is not detecting a detection object;
(2) sets a second threshold greater than the first threshold during intervals when the detection unit is detecting a detection object;
(3) when the detection unit no longer detects a detection object having been under detection, sets a third threshold greater than the first threshold and equal to or less than the second threshold during an interval until a predetermined period of time elapses; and
(4) sets the first threshold after the predetermined period of time elapses.

4. The automatic water faucet according to claim 1, wherein the threshold setting unit:
(1) sets a first threshold during intervals when the detection unit is not detecting a detection object;
(2) sets a second threshold greater than the first threshold during intervals when the detection unit is detecting a detection object; and
(3) when the detection unit no longer detects a detection object having been under detection, sets the threshold varying it from the second threshold until it reaches the first threshold.

5. The automatic water faucet according to claim 2, wherein the threshold setting unit sets as the first threshold a value smaller than distance from an overflow edge of a sink in which water discharged from the water faucet accumulates to the water discharge port, and sets as the second threshold a value greater than the distance from the overflow edge to the water discharge port.

* * * * *